W. F. BUTLER.
METHOD OF AND APPARATUS FOR POSITIONING AND CUTTING FISH.
APPLICATION FILED JAN. 27, 1916.

1,247,502.

Patented Nov. 20, 1917.
2 SHEETS—SHEET 1.

Witness
Russel N. Low

Inventor
William F. Butler
By N N Low
Attorney

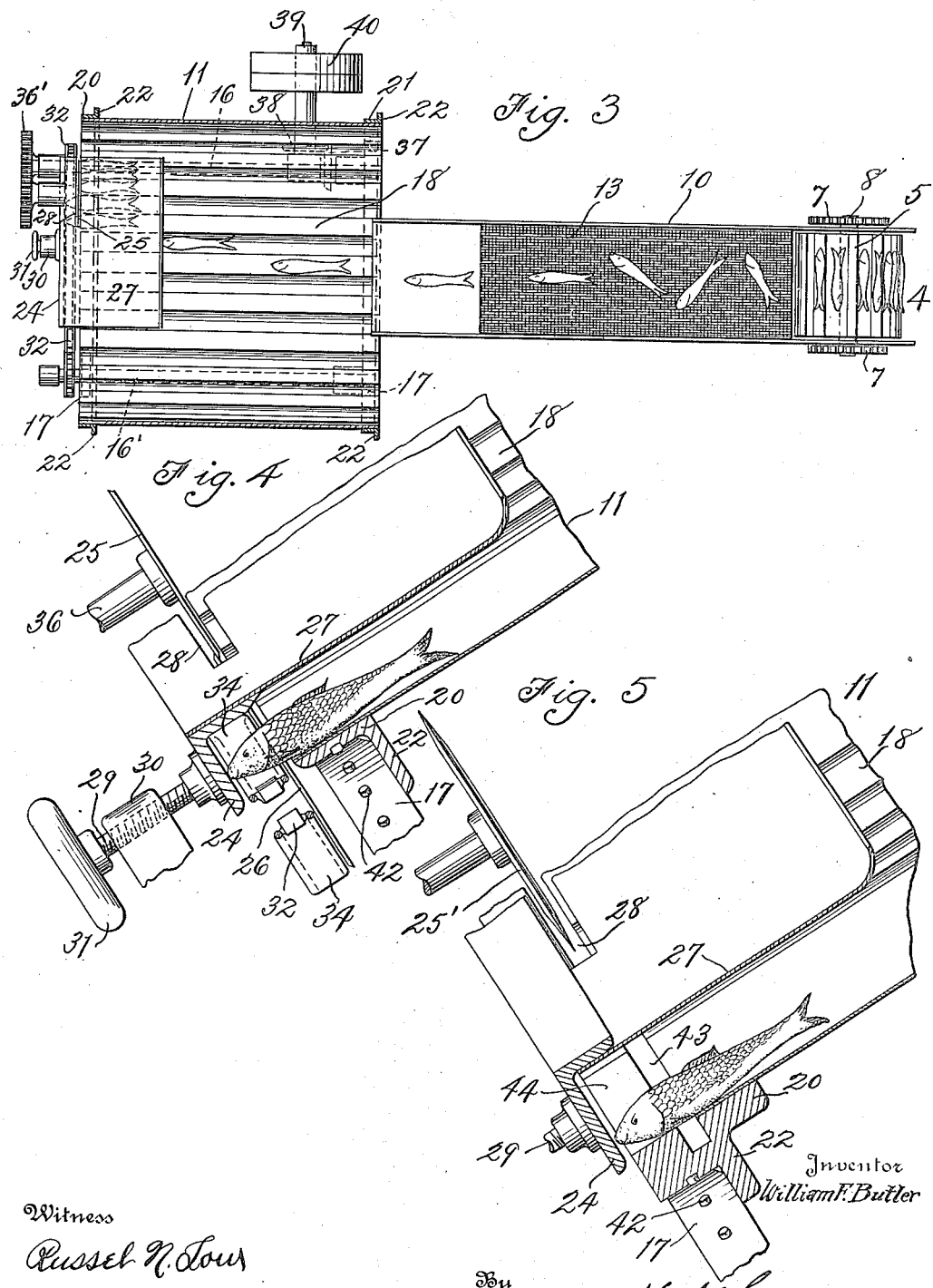

UNITED STATES PATENT OFFICE.

WILLIAM F. BUTLER, OF FAIRPORT, NEW YORK, ASSIGNOR TO AMERICAN CAN COMPANY, OF NEW YORK, N. Y., A CORPORATION OF NEW JERSEY.

METHOD OF AND APPARATUS FOR POSITIONING AND CUTTING FISH.

1,247,502.　　　　　Specification of Letters Patent.　　Patented Nov. 20, 1917.

Application filed January 27, 1916. Serial No. 74,629.

*To all whom it may concern:*

Be it known that I, WILLIAM F. BUTLER, a citizen of the United States, residing at Fairport. in the county of Monroe and State of New York, have invented certain new and useful Improvements in Methods of and Apparatus for Positioning and Cutting Fish, of which the following is a specification.

The invention relates to an improved method or process for positioning fish for the purpose of cutting off their heads, or for packing or other useful operations which may be desired to be performed. The fish as ordinarily received in bulk are in a mixed mass in which the fish lie in all conceivable positions. By these improvements they are in a very simple and inexpensive manner sorted out automatically and caused to lie all with their heads in the same direction. It is then an easy and rapid operation to cut off their heads at the desired point, or approximately so; after which other desired operations may be performed. Such further operations are not herein described and will be the subject of further applications for patent, and the usefulness of the positioning of the fish will be described and illustrated in connection with the final step of procedure which consists in cutting off their heads, and with suitable automatic means therefor.

The invention consists in the method of procedure, and in the parts and combinations thereof designed and adapted for carrying out such method, hereinafter set forth and claimed, with the understanding that said method may comprise other equivalent or additional steps, and that the several necessary parts of the apparatus may be varied in proportions and arrangement without departing from the essential nature or spirit of the invention.

In order to make the invention more clearly understood there is shown in the accompanying drawings means for carrying the same into practical effect, without limiting the improvements, in their useful applications, to the particular constructions which, for the purpose of explanation, have been made the subject of illustration. In the said drawings:—

Fig. 3 is a longitudinal sectional view on a larger scale on line III—III of Fig. 1.

Fig. 4 is a transverse inclined section on line IV—IV of Fig. 2.

Fig. 5 is a view similar to Fig. 3 but showing a modified construction.

Figure 1:
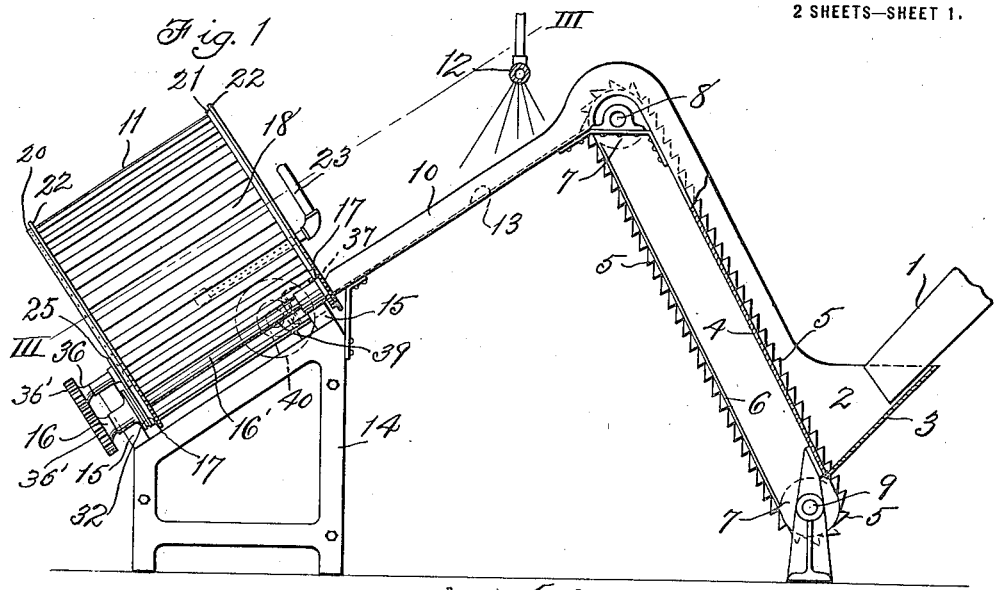
Figure 1 is a side view, partly in section, of an apparatus adapted for carrying out the method, and embodying other features of the invention.

Referring to the drawings, 1 is a chute typical of any fish delivering means, and by which the fish may arrive from the separators which have approximately graded them according to size. This chute delivers into a hopper 2 which may have vertical sides and a front inclined wall 3, its rear wall being formed by the upwardly movable limb of an elevating conveyer 4. This shape of the hopper may begin to cause the transverse positioning of the fish but is not essential to the final result. The conveyer 4 comprises transverse slats or flights 5, preferably of the shape shown so that each forms a shelf for receiving one or more fish in the hopper 2 and carrying them up and over the top turn of the conveyer. The flights 5 are attached to and carried by a belt or chains 6 positioned and driven by pulleys 7 on shafts 8, 9, the top shaft being the driving shaft and actuated by suitable means not shown.

As the fish fall from the conveyer 4 they fall, in positions parallel with each other and transverse to the line of advance and some with their heads pointing to the right and others with their heads pointing oppositely (Fig. 3) as may happen, on the surface of a rearwardly inclined chute 10. This chute has such suitable inclination as causes the fish to slide downwardly and rearwardly into a constantly revolving drum 11. The friction of the fish on the top surface of the chute 10 causes them all to turn with their heads downward and rearward, so that each fish enters the drum 11 head first. This turning of the fish may be said to be due either to the retarding of their tails or the greater weight of the head portions or to the resistance of the fins and scales against allowing the fish to slide tail first, but perhaps more or less to all of these causes. It will be understood that a stream of water may be caused to flow down the chute 10, which may be employed in case the chute has not a steep inclination. A water-pipe for this purpose is indicated at 12 (Fig. 1), but this is not an essential part of the apparatus and is to be employed only in case it be desired to facilitate the movement of the fish which may not be wet enough. The chute 10 may be provided with a bottom surface of mesh wire 13 to give a little resistance to the sliding of the fish and aid in compelling them to turn as above mentioned.

14 is a frame having a rearwardly inclined top on which are fixed bearings 15 in which are journaled, one at each side of the frame, downwardly and rearwardly inclined shafts 16, 16'. On the ends of these shafts are fixed or mounted rollers 17 on which the drum is mounted in its inclined position. The drum is shown as formed with a cylindrical corrugated wall 18 riveted or suitably attached to external rings 20 and 21. These rings are provided at their upper ends with peripheral flanges 22 which engage against the upper sides of the said rollers 17 and hold the drum from sliding downward. The longitudinal flanges of the rings serve as tracks which run upon the said rollers as the drum is revolved. Each of the corrugations of the drum wall 18 is of sufficient size to receive one or more fish as they leave the chute 10. It will be understood that the corrugations pass successively across the paths of the fish and the number of fish received in each corrugation may be varied according to different conditions, such as the size of the fish and the frequency with which they are fed from the elevating conveyer as compared with the speed of rotation of the drum; it being desirable not to have more fish in any corrugation than the same is wide enough to conveniently hold, which result can be attained by suitably regulating the speeds of the said parts. 23 (Fig. 1) is a water-pipe arranged to sprinkle the interior and lower part of the drum to make it slippery so as to facilitate the downward sliding of the fish therein along the said corrugations. The fish quickly arrive at the lower end of the drum and they are stopped uniformly by a gage 24 (Fig. 4). When so stopped their heads project a little beyond the lower end of the drum and the rear line of their gills is substantially in line with inner and outer cutters or knives 25, 26 against the edges of which the fish are successively carried by the rotation of the drum, so that their heads will all be cut off at the desired point. While the fish are thus at the lower end of the drum and approaching the cutters they are confined by a plate 27 which is attached to the gage 24 and extends up a little past the cutting point (Fig. 3), being provided with a space 28 in which the cutters work, and which is wide enough for the adjustment of the gage longitudinally of the drum, as may be required to adapt the machine for operation on fish of different sizes. It will be understood that the gage 24 is fixed and does not partake of the rotation of the drum, being carried at the inner end of an adjusting screw 29 which works in a fixed bearing 30 and is provided with an adjusting handle 31. The bearing 30 is supported from the frame 14.

32 indicates an endless chain which is mounted on sprockets 33 fixed on the shafts 16, 16', and which travels with the same speed as the drum, the sprockets and rollers 17 being of substantially the same diameter. This chain is provided with flights 34 which are spaced apart to correspond substantially with the corrugations of the drum, so that a fish sliding down a corrugation will enter with its head between the said flights 34. The chain 32 is arranged just beyond the lower end of the drum and forms a support for the heads of the fish, and a means for carrying the heads against the cutters and a means for discharging the cut-off head separately from the body at a point beyond the cutters. A fish head so discharged is indicated at 35 in Fig. 2. The upper limb of the endless chain is caused to conform to the drum by the engagement of the upper edges of the flights 34 with the under surface of the gage 24 (Fig. 4), the gage conforming with the drum.

The inner cutter 25 is fixed on a shaft 36 which is suitably supported from the frame 14, and the outer cutter 26 lies against the inner cutter and is fixed on the roller shaft 16. Shafts 16 and 36 are operatively connected by toothed gears 36'. The shaft 16 has fixed thereon a beveled pinion 37 which meshes with a similar pinion 38 on a transverse shaft 39, to which latter power is applied at will to operate the described mechanism by fast and loose pulleys 40 on the shaft.

Figure 2:
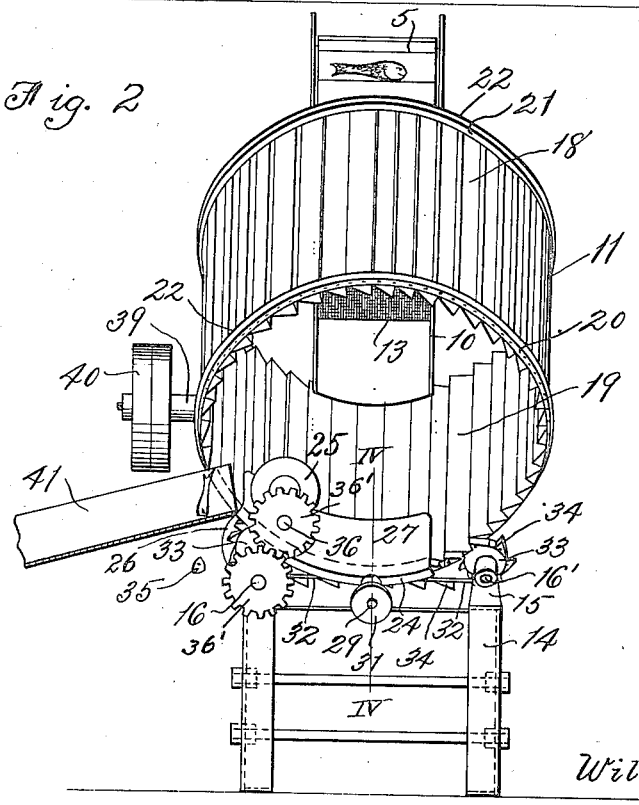
Fig. 2 is a rear view of the same.

After the heads have been cut off the bodies of the fish are carried upward and downward by the revolutions of the drum until they slide out of the corrugations and fall into a chute 41 (Fig. 2).

It is preferred to give the drum a positive rotation, which may be done by providing one of the rollers 17 with short pins 42 which are arranged to enter corresponding holes in the ring 20.

The said chain may be dispensed with and the drum correspondingly extended downward so as to support and carry the heads of the fish and this construction is illustrated in Fig. 5. Here the lower ring is formed with a groove 43 in which the cutter may work, and the interior part of the ring below said groove is provided with a separate set of corrugations 44, preferably of sheet metal, in which the heads of the fish rest. Also in this construction is illustrated the use of a single cutter, the same being indicated at 25'.

The corrugated drum is typical of any equivalent inclined and movable surface having means for holding the fish alined side by side, parallel with each other, with their heads in the same direction, and such a surface or carrier may be of various forms and arrangements without departing from the invention.

The positioning of the fish for cutting also serves to position them suitably for the action of an eviscerating device, when that is employed, the same to operate in immediate succession to the cutters.

The elevator 4 has or may have its flights 5 of such width and length that each will pick up and carry one fish, and the moving corrugated surface may be correspondingly timed so that one fish will occupy each corrugation against the gage 24. This is more important for eviscerating than for cutting.

What is claimed is:

1. The method of positioning fish which consists in sliding the fish successively in a downward direction by the aid of gravity and first with retarding friction which causes them to all turn in a head foremost direction and then with a continued longitudinally guided downward movement which brings them to a place of alinement, there alining the fish with their heads downward all at the same plane, and successively moving the alined fish laterally for further operation on the same.

2. The method of positioning fish from a mass of the same in which the fish are without regular arrangement, which consists in lifting the fish successively and parallel with each other from said mass but unarranged with respect to the direction of their heads and tails, then causing said fish to move downwardly, first sidewise with retarding friction which causes them to all turn in a head foremost direction and then with a continued downward movement which brings them to a place of alinement, there alining the fish with their heads all at the same plane, and continuously moving the fish laterally for further operation on the same.

3. The method of positioning and cutting fish, which consists in separating and elevating fish from a mass of the same and positioning them transverse to their direction of movement, then causing them to slide along a frictionally retarding surface so as to turn thereon and present their heads foremost, maintaining said fish with their heads downward, assembling all of said fish successively and gaging them with their head ends downward at the same plane, and then moving them parallel with said plane and cutting off their heads.

4. The method of positioning and cutting fish, which consists in separating and elevating fish from a mass of the same and positioning them transverse to their direction of movement, then causing them to slide along a frictionally retarding surface so as to turn thereon and present their heads foremost, maintaining said fish with their heads downward, assembling all of said fish successively and gaging them with their head ends downward at the same plane, and then cutting off their heads.

5. The method of positioning fish, which consists in delivering them separated or sorted approximately as to size, selecting them individually and elevating them arranged parallel with each other, then causing them to turn and present their heads foremost, maintaining said fish with their heads downward and collecting them successively gaged head foremost, and cutting off their heads by movement transverse to the direction of advance of the fish.

6. A method of positioning and cutting fish, which consists in advancing the fish successively, causing them to turn head foremost, maintaining said fish with their heads downward, gaging them all at the same plane, while inclined head downward, and further moving them, while so gaged, in a direction substantially transverse to the vertical plane of their inclination to a point of further operation.

7. The method of positioning fish which consists in causing them to slide along a frictionally retarding surface, so as to turn on said surface and present their heads foremost, maintaining said fish with their heads downward and gaging said fish with their heads downward and their tails upward.

8. The method of positioning fish which consists in causing them to slide along a frictionally retarding surface, so as to turn on said surface and present their heads foremost, maintaining said fish with their heads downward and collecting said fish successively at a single plane of cutting with their head ends inclined downward at said plane.

9. The method of positioning fish which consists in causing them to slide along a frictionally retarding surface, so as to turn on said surface and present their heads foremost, maintaining said fish with their heads downward, collecting said fish successively at a single plane of cutting with their head ends inclined downward at said plane, and then moving them laterally, when so positioned, and cutting off their heads at the same plane.

10. The combination of a movable series of downwardly inclined fish guiding and alining devices, a hopper for a mass of unarranged fish, automatically acting means for removing the fish from said hopper and positioning them head downward and delivering them heads inclined downward in said guiding devices, and means for gaging the fish.

11. In a fish positioning machine, the combination of an inclined slide whereby the fish delivered in any manner to said slide are free to turn thereon and are caused to be positioned parallel with the direction of sliding with their heads downward, a carrier having fish-engaging and guiding devices to which the fish are directly delivered by said slide so as to continue their sliding thereon, means for moving the carrier crosswise of said slide, and means for gaging the longitudinal position of the fish on said carrier.

12. In a fish positioning machine, the combination of an inclined slide having a substantially flat surface whereby the fish delivered in any manner to said slide are free to turn on the plane thereof and are caused to be positioned parallel with the direction of sliding with their heads downward, and means for alining the fish side by side with their heads at the same plane.

13. In a fish positioning apparatus, the combination of a slide, a rotary drum having an interior inclined surface provided with means for holding the fish gaged side by side parallel with each other with their heads downward in the same direction, to which surface the fish are delivered head foremost by said slide, and means for gaging and alining the fish with their heads at the same transverse plane.

14. In a fish positioning apparatus, the combination of a slide, a rotary drum having an interior surface provided with means for holding the fish gaged side by side parallel with each other with their heads downward in the same direction, to which surface the fish are delivered head foremost by said slide, means for gaging and alining the fish with their heads at the same transverse plane, and means for rotating the drum across the lines of said delivery of the fish.

15. In a fish positioning apparatus, the combination of an inclined fish positioning slide having a substantially flat surface on which the fish are free to turn to a longitudinal position with their heads downward, a movable inclined surface provided for holding the fish longitudinally alined side by side parallel with each other to which surface the fish are directly delivered from said slide to continue their sliding head foremost, means for gaging and alining the fish on said movable surface with their heads at the same transverse plane, means for delivering successive individual fish to said slide from a mass of unarranged fish, and mechanism actuating said movable inclined surface and said delivering means whereby they are respectively timed in movement relative to each other for the distribution of the fish on said movable inclined surface.

16. In a fish positioning apparatus, the combination of an elevating conveyer, a slide to which the fish are delivered by the conveyer, a rotating inclined concave surface provided with means for holding the fish gaged side by side parallel with each other at an angle to the axis of rotation of said surface with their heads downward in the same direction, to which surface the fish are delivered head foremost by said slide, means for gaging and alining the fish, means for transversely cutting the fish and means for moving the said inclined surface to carry the fish to said cutting means.

17. In a fish positioning apparatus, the combination of an elevating conveyer, a slide to which the fish are delivered by the conveyer, a rotating inclined concave surface provided with means for holding the fish gaged side by side parallel with each other with their heads downward in the same direction, to which surface the fish are delivered head foremost by said slide, means for gaging and alining the fish, means for transversely cutting the fish and means for moving the said inclined surface to carry the fish to said cutting means.

18. In a fish positioning apparatus, the combination of an elevating conveyer, a slide to which the fish are delivered by the conveyer, a rotating inclined concave surface provided with means for holding the fish gaged side by side parallel with each other with their heads downward in the same direction, to which surface the fish are delivered head foremost by said slide, a device for supplying water to said inclined surface, means for gaging and alining the fish, means for transversely cutting the fish and means for moving the said inclined surface to carry the fish to said cutting means.

19. In a fish positioning apparatus, the combination of an elevating conveyer, a slide to which the fish are delivered by the conveyer, a rotating inclined concave surface provided with means for holding the fish gaged side by side parallel with each other with their heads downward in the same direction, to which surface the fish are delivered head foremost by said slide, means for gaging and alining the fish, means for transversely cutting the fish, means for moving the said inclined surface to carry the fish to said cutting means, and an independent conveying device for the heads of the fish.

20. In a fish positioning apparatus, the combination of an elevating conveyer, a slide to which the fish are delivered by the conveyer, a rotating inclined concave surface provided with means for holding the fish gaged side by side parallel with each other with their heads downward in the same direction, to which surface the fish are delivered head foremost by said slide, means for gaging and alining the fish, an adjusting device for said gaging means, means for transversely cutting the fish and means for moving the said inclined surface to carry the fish to said cutting means.

21. The combination of an inclined rotary drum having on its interior means for guiding fish and holding them in alinement; means for gaging the fish in said drum; a decapitating knife against which the gaged fish are carried by the rotation of the drum; and automatic means for delivering fish head first into said drum from a miscellaneous collection of fish.

22. The combination of an endless carrier having a concave surface provided with means for holding fish in parallel alinement thereon with their heads in the same direction; a decapitating knife; a gravity fish-positioning slide for delivering fish head first to said concave surface; and an elevator having means for holding fish in position thereon parallel with each other and transverse to the direction of said slide.

23. The combination of an endless moving carrier having an inclined concave surface provided with means for holding fish thereon in parallel alinement with their heads in the same direction; a decapitating knife; and a gravity fish-positioning slide for delivering fish head first to said surface of the carrier.

In testimony whereof I affix my signature.
WILLIAM F. BUTLER.